July 16, 1946.　　C. W. WILKINSON　　2,404,017
DISTRIBUTOR SHAFT AND CAMSHAFT ADAPTATION
Filed March 18, 1943
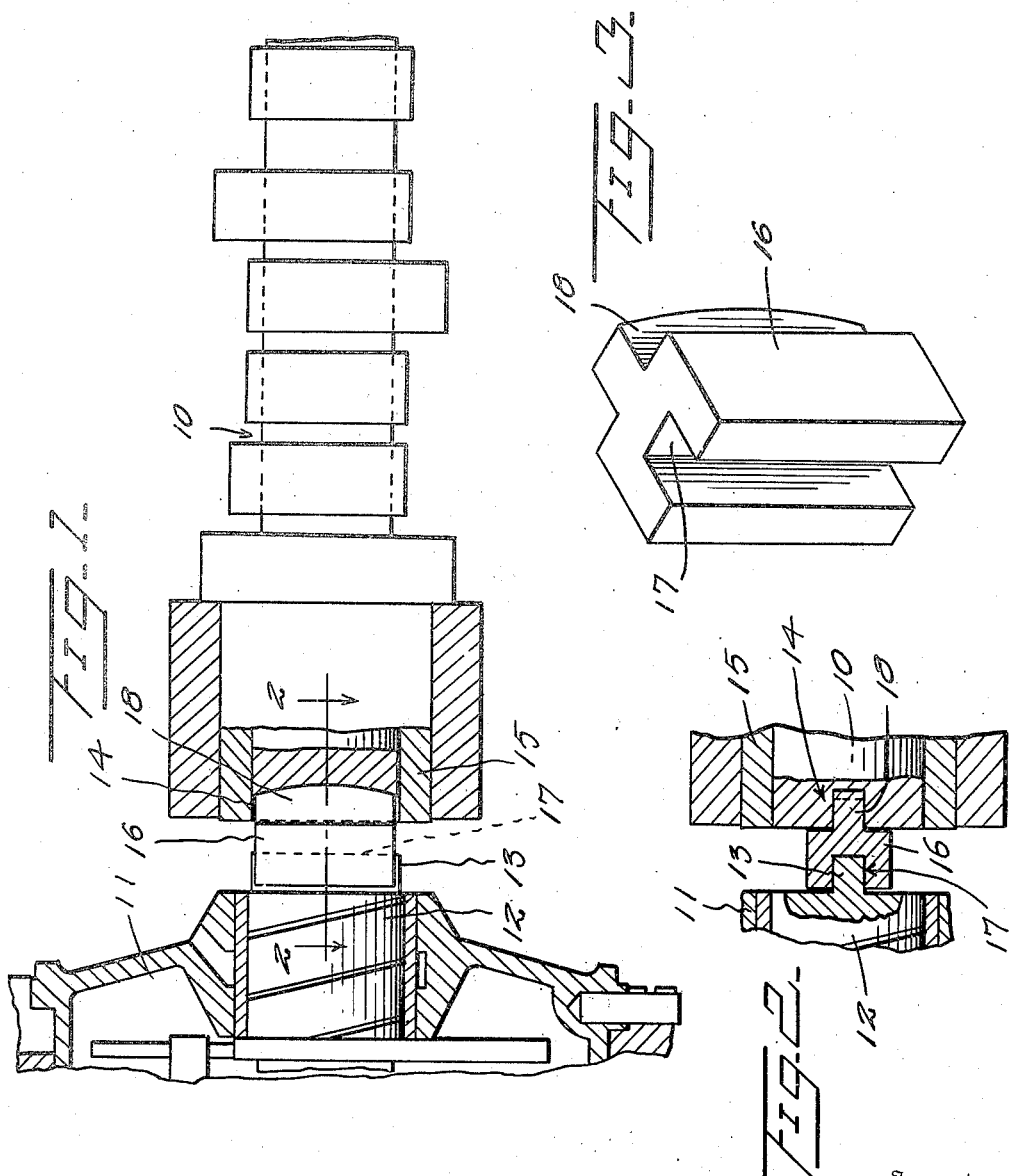
Inventor
C. W. Wilkinson
By L. F. Randolph
Attorney Patented July 16, 1946

2,404,017

UNITED STATES PATENT OFFICE 2,404,017

DISTRIBUTOR SHAFT AND CAMSHAFT ADAPTATION

Charles W. Wilkinson, Plant City, Fla., assignor to James G. Helms, Plant City, Fla.

Application March 18, 1943, Serial No. 479,664

1 Claim. (Cl. 64—1)

This invention relates to an adaptation whereby the cam shaft of one model automobile may be operatively connected with the distributor shaft of other models of the automobile, and more specifically it aims to provide such a means capable of installation between the cam shafts of the propelling engines of the 1942 model Ford automobile and distributors of earlier model Ford automobiles (1932 to 1941 inclusive) to enable the use of the 1942 model replacement Ford automobile motors or engines in the earlier Ford model automobiles. By means of the invention it is possible to use the 1942 Ford motors in as early Ford automobile models as 1932.

The more specific objects and advantages will become apparent from a consideration of the description following taken in connection with accompanying drawing illustrating an operative embodiment.

In said drawing:

Figure 1 is a view partly in elevation and partly in section, showing an adaptation between the cam shaft of a 1942 model Ford motor and an earlier model Ford distributor;

Figure 2 is a detail section taken on the line 2—2 of Figure 1; and

Figure 3 is a perspective view of the adaptor or coupling employed.

Referring specifically to the drawing, wherein like reference characters designate like or similar parts, a cam shaft is shown at 10 which is the cam shaft of a 1942 Ford motor as used in a 1942 automobile. This cam shaft is to be considered as installed in a 1942 Ford motor operatively bolted or attached to the chassis of a Ford automobile of any model from 1932 to 1941, both inclusive.

With the Ford motor of which the cam shaft 10 forms a part, a timer or distributor is employed at 11, and this timer is the one forming standard equipment for the Ford automobile; that is, being a 1932 model distributor for a 1932 Ford automobile, a 1933 model distributor for a 1933 Ford automobile, etc.

When a 1942 Ford motor is installed in an earlier model Ford automobile the same bolts and bolt holes are used to connect the 1942 motor as are used to connect the standard motor for that automobile. Under these conditions, there is a difference in the length of the main shaft 12 of the distributor 11 and the cam shaft 10, with a space or gap resulting between them as best shown in Figures 1 and 2. Into this gap extends a diametric projection 13 on the end of the distributor shaft 12 while the opposed end of the cam shaft 10 has a recess 14 therein whose ends are surrounded by a collar 15 associated with the timing gear (not shown) adapted to be mounted about the same. I employ an adaptor or coupling 16 in the gap which is of the shape best shown in perspective in Figure 3. This adaptor has a groove or slot 17 which intimately receives and fits the projection 13 and on its opposite face has a rib or projection 18 which fills and intimately fits the recess 14. The degree of tightness between the projections 13 and 18 and the walls of the recesses respectively engaged thereby may be to any degree desired but preferably relatively tight, requiring the use of a hammer to drive the adaptor or coupling into engagement with both the projection 13 and the recess 14. As a result of the construction described, the cam shaft and the distributor shaft are effectively joined or coupled for unitary rotation.

The invention provides an exceedingly simple and inexpensive means whereby a 1942 Ford motor may be installed in the chassis of earlier Ford automobiles, using the same bolts and bolt holes as secured the original motor in the chassis.

The present invention is a very much simpler and cheaper means of installing and using 1942 V-8 Ford motors in earlier model Ford automobiles, since by the other known methods, in one instance, the 1942 Ford wiring and distributor must be used, discarding the old; and in another instance a 1941 Ford motor cam shaft first must be installed in the 1942 Ford motor.

Various changes may be resorted to provided that they fall within the spirit and scope of the invention.

I claim as my invention:

A coupling key for connecting the cam shaft of a replacement motor with the shaft of a distributor of the original motor comprising a body member having a slot on one side to operate with a projection on the end of the distributor shaft and having a projection parallel to and opposite the slot for cooperation with a slot in the end of the cam shaft, said projection having an arcuate end for cooperation with a corresponding shaped depression in the end of the cam shaft.

CHARLES WM. WILKINSON.